(12) United States Patent
Koehler

(10) Patent No.: US 7,296,985 B2
(45) Date of Patent: Nov. 20, 2007

(54) DEVICE FOR GRANULATING THERMOPLASTIC MATERIALS

(75) Inventor: Willfried Koehler, Grossostheim (DE)

(73) Assignee: Rieter Automatik GmbH, Grossostheim (DE)

( * ) Notice: Subject to any disclaimer, the term of this patent is extended or adjusted under 35 U.S.C. 154(b) by 57 days.

(21) Appl. No.: 10/572,394

(22) PCT Filed: Sep. 9, 2004

(86) PCT No.: PCT/EP2004/010086

§ 371 (c)(1), (2), (4) Date: Mar. 16, 2006

(87) PCT Pub. No.: WO02/40236

PCT Pub. Date: May 23, 2002

(65) Prior Publication Data

US 2007/0065530 A1   Mar. 22, 2007

(30) Foreign Application Priority Data

Sep. 26, 2003   (DE) ................... 103 44 793

(51) Int. Cl.
*B29B 9/06* (2006.01)
*B29C 47/08* (2006.01)

(52) U.S. Cl. ............... 425/67; 425/168; 425/196; 425/311; 425/313; 264/142

(58) Field of Classification Search ............ 425/67, 425/313, 311, 168, 196; 264/142
See application file for complete search history.

(56) References Cited

U.S. PATENT DOCUMENTS

| | | | | |
|---|---|---|---|---|
| 3,196,487 A | * | 7/1965 | Snelling | 425/168 |
| 3,266,090 A | * | 8/1966 | Gosney | 425/67 |
| 4,184,833 A | * | 1/1980 | Buchan et al. | 425/311 |
| 4,500,271 A | * | 2/1985 | Smith | 425/67 |
| 4,800,792 A | | 1/1989 | Bertolotti et al. | |
| 5,360,585 A | | 11/1994 | Ishida et al. | |
| 5,587,186 A | * | 12/1996 | Voigt | 425/310 |
| 5,599,562 A | * | 2/1997 | Harris et al. | 425/67 |
| 5,624,688 A | | 4/1997 | Adams et al. | |
| 5,814,350 A | | 9/1998 | Rockstedt | |
| 6,332,765 B1 | | 12/2001 | Spelleken | |
| 6,793,473 B1 | * | 9/2004 | Fridley | 425/67 |
| 2003/0031742 A1 | * | 2/2003 | Smit et al. | 425/67 |

FOREIGN PATENT DOCUMENTS

| | | |
|---|---|---|
| DE | 1 977 175 U | 1/1968 |
| DE | 1811493 U | 7/1970 |
| DE | 44 19 786 C1 | 12/1995 |
| DE | 196 47 396 A1 | 5/1998 |
| EP | 0 992 328 A2 | 4/2000 |
| GB | 1 090 193 A | 11/1967 |
| WO | WO-02/40236 A1 | 5/2002 |

* cited by examiner

*Primary Examiner*—James P. Mackey
*Assistant Examiner*—Seyed Masoud Malekzadeh
(74) *Attorney, Agent, or Firm*—Birch, Stewart, Kolasch & Birch, LLP

(57) ABSTRACT

The invention relates to a device for granulating thermoplastic materials with a die plate and a rotary cutter head, said rotary cutter head carrying cutter knives and being positioned in front of said die plate in a water chamber, said rotary cutter head being centered by means of a rocker bearing and being connected in rotationally fixed manner to an axially displaceable drive shaft through a torque transmitting element, the torque transmitting element being in the form of a tubular slotted spring surrounding the drive shaft, said slotted spring connecting the end of the drive shaft facing the rotary cutter head to the rotary cutter head in the peripheral region of the rocker bearing, said rocker bearing being disposed between the end of the drive shaft and the rotary cutter head in the radial direction.

3 Claims, 5 Drawing Sheets

Figur 3

Figur 4

DEVICE FOR GRANULATING THERMOPLASTIC MATERIALS

The invention relates to a device for granulating thermoplastic materials with a die plate and a rotary cutter head, said rotary cutter head carrying cutter knives and being positioned in front of said die plate in a water chamber, said rotary cutter head being centered by means of a rocker bearing and being connected in rotationally fixed manner to an axially displaceable drive shaft through a torque transmitting element.

Such a device is presented and described in British patent specification 1090193. In this device, the rocker bearing is installed centrally between the rotary cutter head and the die plate, more specifically in the form of a spherical cap on the die plate into which is fitted a corresponding spherical portion on the rotary cutter head, which is fastened to the torque transmitting element at a distance from the drive shaft.

The torque transmitting element is composed of ribs which extend axially with respect to the drive shaft and which project away from the rotary cutter head towards the drive shaft and are attached to the rotary cutter head. These ribs engage corresponding grooves on the periphery of the drive shaft, this enabling the axial displacement of the drive shaft and, at the same time, the transmission of torque. Disposed between the end of the drive shaft and the torque transmitting element is a coil spring which is supported against the drive shaft at one end and against the torque transmitting element at the other end, thereby exerting a weak pressure on the torque transmitting element and thus on the rotary cutter head, with the result that the cutter knives of the rotary cutter head are held in contact with the die plate. An angular displacement of the rotary cutter head relative to the die plate is compensated for by the cap integrated in the die plate and by the spherical portion on the torque transmitting element, said spherical portion being inserted into the cap. During operation, the ribs projecting away from the torque transmitting element—said ribs engaging the aforementioned grooves on the periphery of the drive shaft—move under frictional engagement in a water chamber positioned in front of the die plate. Lubrication of these ribs to prevent friction relative to the grooves guiding them is thus difficult to achieve. Moreover, the ribs guided by the grooves permit only very limited angular displacement of the rotary cutter head with respect to the die plate.

A similar design of a device for granulating thermoplastic materials is disclosed in WO specification 02/40236A1. In this device, as in the subject matter of the publication discussed above, a spherical cap is used in connection with the rotary cutter head, said spherical cap being engaged by the corresponding portion of a complete sphere attached to the end of the drive shaft. The torque transmitting element is composed in this case of axially oriented teeth connected to the drive shaft and of grooves in the rotary cutter head which receive the teeth, wherein the teeth are designed after the fashion of involute gearing to permit a tilting motion. In this case, too, the torque transmitting element, composed of teeth and grooves, is accommodated in the region of a water chamber. The torque transmitting element is advantageously also lubricated. However, this lubrication needs to be renewed very frequently because of the surrounding water.

A further design of a device for granulating thermoplastic materials is contained in U.S. Pat. No. 5,624,688, in which the torque transmitting element is composed of two balls, said balls on the one hand being held in caps provided on the end of the drive shaft and on the other hand being supported against a penetration in the rotary cutter head. These balls must, if necessary, transmit a substantial torque and are therefore subject to rapid wear. A slight tilting motion of the rotary cutter head is made possible in this device in that a ring with a spherical outer surface is screwed onto the end of the drive shaft and is inserted into a corresponding penetration with a correspondingly spherical inner surface in the rotary cutter head.

Reference is additionally made to European patent application EP 0992328A2, in which a connection between drive shaft and rotary cutter head is accomplished by a bellows which on the one hand has to transmit the torque and which on the other hand is also intended to facilitate a slight tilting motion of the rotary cutter head. Owing to the use of the bellows, which, within the range of its mobility, maintains a substantial distance from the rotary cutter head in a manner similar to a rocker bearing, the rocker bearing, which permits tilting motions of the rotary cutter head, is provided relatively far away from the rotary cutter head, with the result that, along with the tilting motion, the rotary cutter head also automatically executes a radial excursion from its normal rotary motion.

Apart from the above-discussed publication, which uses a rocker bearing that is intentionally kept at a distance from the rotary cutter head, the other known devices have the problem that the water penetrating from the water chamber into the torque transmitting element causes said element to be trouble-prone, this necessitating relatively frequent inspection and, when needed, adjustment of said element.

The object of the invention is to design the initially mentioned device to be robust and maintenance-free. This is accomplished in one embodiment in that the torque transmitting element is in the form of a tubular slotted spring surrounding the drive shaft, said slotted spring connecting the end of the drive shaft facing the rotary cutter head to the rotary cutter head in the peripheral region of the rocker bearing, said rocker bearing being disposed between the end of the drive shaft and the rotary cutter head in the radial direction.

In another embodiment based on the same principle, the torque transmitting element consists of a plurality of tubular slotted springs, said slotted springs being provided rotationally symmetrically in an annular arrangement around the drive shaft and connecting the drive shaft through a flange on the drive shaft to the rotary cutter head in the peripheral region of the rocker bearing, said rocker bearing being disposed between the flange and the rotary cutter head.

The tubular slotted spring is a known component, as is described in German patent specification 0318669B1, for example. It is composed of a tubular segment, the wall of which is provided with slots which, for example, have a radial length of one third of the diameter of the tubular segment and which are axially juxtaposed with such an offset that, between each slot and the next, there remain between the slots axially extending webs which transmit forces representing a torque. Owing to the thus achieved division of the tubular segment into mutually offset webs, there still results, given corresponding loading, a swivelling of the radial planes of the ends relative to one another, which, when one end of the slotted spring is held fast, results in a corresponding tilted position at the other end thereof with an elastic restoring force. This characteristic of the slotted spring is exploited through suitable installation in the device according to the invention, with the result that no lubrication whatever or other maintenance is required for the torque transmitting element, namely the slotted spring, and, consequently, operation of the device is substantially improved even over fairly long periods. This improvement in the characteristics of the device according to the invention obtains in the two above-discussed application cases, namely the case where one tubular slotted spring surrounding the drive shaft is used, and the case where a plurality of tubular slotted springs are provided rotationally symmetrically in an annular arrangement around the drive shaft. In both cases, the functioning of the single slotted spring or plurality of slotted springs takes place in a water chamber, the water surrounding the slotted springs not impairing the functioning thereof. The arrangement of the rocker bearing between the end of the drive shaft and the rotary cutter head only allows the latter to assume a tilted position relative to the drive shaft without there being any axial displacement of the rotary cutter head. This is important because such displacement would also displace the ring passed through by the cutters, this possibly resulting in an uneven sweeping of the individual orifices of the die plate.

An advantageous design of the device with regard to the rocker bearing results when the rocker bearing is in the form of a ring with a spherical outer surface and of a penetration with a corresponding spherical inner surface in the rotary cutter head, wherein the ring is removably fastened to the drive shaft by means of a screw screwed into the drive shaft from the side of the die plate.

Because of this design of the rocker bearing and its integration into the rotary cutter head, any necessary maintenance of the rotary cutter head or its cutters can be made easier in that the screw penetrating the ring is unscrewed from the drive shaft and the ring is thus removed, whereupon it is also possible to remove the rotary cutter head, which is otherwise held in place by the ring through the penetration with correspondingly spherical inner surface in the rotary cutter head.

Illustrative embodiments of the invention are shown in the drawings, in which.

Figure 1:
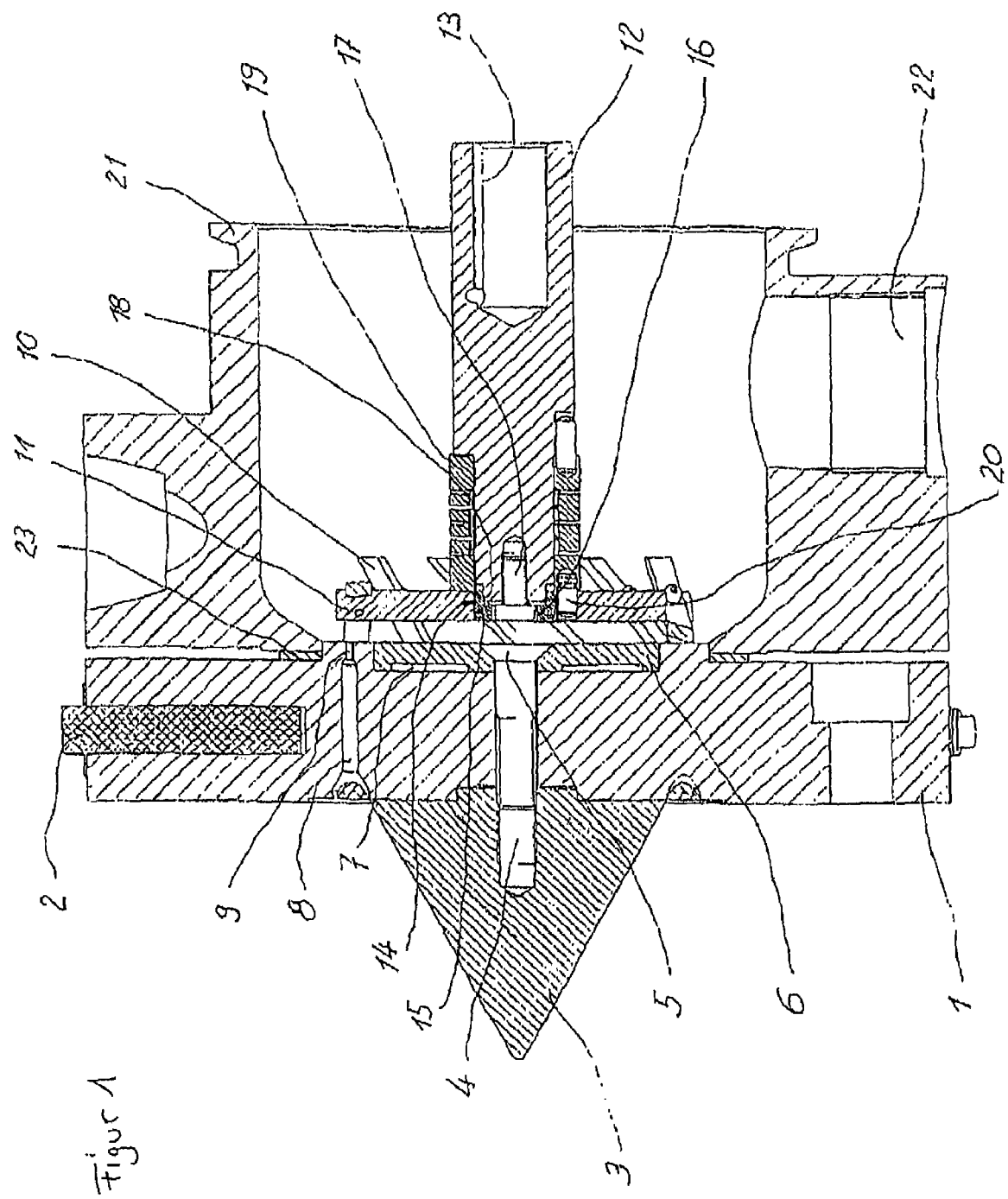
FIG. 1 shows the device in section with centrally disposed slotted spring.

The device for granulating thermoplastic materials shown in FIG. 1 has the die plate 1 with the heating element 2 inserted therein. Positioned in front of the die plate in known manner is a cone 3, which is part of the piping components (not shown) for supplying liquid thermoplastic material. The cone 3 is screwed onto the die plate 1 by means of the screw 4, whose head 5 presses the insulating plate 6 against the die plate 1. The insulating plate 6 leaves open a narrow space 7 with respect to the die plate 1, which space 7 serves, when filled with air, to insulate the die plate 1. The melt pipes 8 pass through the die plate 1 and terminate in the orifices 9. The orifices 9 are let into the die plate 1 in a plurality of annular arrangements and serve in known manner to allow plastic for granulation to issue from the openings thereof.

In the region of the orifices 9, the cutters 10 sweep thereover. Said cutters are held by the rotary cutter head 11, with the result that, as the rotary cutter head 11 rotates, the cutters 10 cut the plastic material issuing from the orifices to form granulate. During this process, the cutters 10 remain in physical contact with the die plate 9 and glide over the die plate and the orifices, this ensuring the clean cutting of the plastic issuing from the orifices 9.

The rotary cutter head 11 is attached to the drive shaft 12 by the end face of the drive shaft facing the rotary cutter head. The drive shaft 12 is connected to a drive motor (not shown here), for which purpose the drive shaft 12 is provided in known manner with the threaded hole 13.

The connection between the drive shaft 12 and the rotary cutter head 11 is designed as follows: the rotary cutter head 11 has a central recess 14 whose inner surface corresponds to the surface of a sphere. The spherical portion 15 is fitted into this recess 14 in such a manner that the rotary cutter head 11 can be moved around the spherical portion 15 in the manner of a tilting motion to all sides. The spherical portion 15 has a receptacle for the head 16 of the screw 17, which is screwed into the end face of the drive shaft and thus draws the spherical portion 15 towards the end face of the drive shaft 12 and secures it thereto. The spherical portion 15 has, for its centered attachment to the drive shaft 12, an annular projection 18 that fits onto a matching projection on the end face of the drive shaft 12. As a result of this securing of the spherical portion 15 and of the receptacle for the rotary cutter head 11 by means of the spherical shape of the outer surface of the spherical portion 15 and of the inner surface 14 of the rotary cutter head 11, the latter can be tilted relative to the drive shaft 12 such that the rotary cutter head 11 can be displaced from its right-angled position with respect to the drive shaft 12 (as shown in FIG. 1) into a position that is tilted by a small angle relative thereto.

As a result of the above-described spherical design of the spherical portion 15 and the inner surface 14 of the rotary cutter head 11, the rotary cutter head 11 cannot be displaced in the axial direction relative to the spherical portion 15. In order to make it at all possible to join together the spherical portion 15 and the rotary cutter head 11, the rotary cutter head 11 is, in known manner for such connections, provided in the region of its inner surface 14 with a recess into which the spherical portion 15 can be inserted perpendicular to the working position and, when inserted, can be rotated through 90°, this establishing the connection between the spherical portion 15 and the rotary cutter head 11 so as to permit a slight tilting motion.

The tubular slotted spring 19 is provided for the transmission of torque from the drive shaft 12 to the rotary cutter head 11. The special design and functioning of the tubular slotted spring 19 will be discussed in detail in connection with FIG. 3. The slotted spring 19 is placed on the appropriate end of the drive shaft 12 and is rigidly connected thereto, for example by pinning. In the region of the individual sections of the slotted spring 19, said spring has an intermediate space with respect to the drive shaft 12, the consequence of which is that the slotted spring 19 can, in relation to the drive shaft 12, both be rotated and also be displaced laterally to a slight degree to the extent of the distance between the slotted spring 19 and the drive shaft 12. The other end of the slotted spring 19 is connected in rotationally fixed manner to the rotary cutter head 11. Said rotationally fixed connection is produced here by pinning between the rotary cutter head 11 and the end of the slotted spring 19. One of the pins 20 is shown in FIG. 1.

When the drive shaft 12 rotates, the rotary cutter head 11 is also set in rotation through the slotted spring 19, the cutters 10 gliding over the surface of the die plate 1. When the precise position of the drive shaft 12 relative to the die plate 1 is moved, for example on account of temperature-induced displacements, or for example also due to wear of the cutters 10 or the relevant surface of the die plate 1, the slotted spring ensures that, firstly, the cutters 10 remain in contact with the surface of the die plate 1 on account of an axial pressure exerted by the slotted spring 19 against the rotary cutter head 11, a slight tilting of the drive shaft 12 relative to the die plate 1 being compensated in that the rotary cutter head 11 is able to move on the spherical portion 15 such as to adapt to the direction dictated by the surface of the die plate 1 without the possibility of the rotary cutter head slipping out of its centered position relative to the drive shaft 12. This ensures that, with the torque being maintained, the rotary cutter head 11 can always be held in a centered position relative to the drive shaft 12 and with its cutters 10 in contact with the surface of the die plate 1.

The region of the die plate 1 with the orifices 9 and the rotary cutter head 11 with its cutters 10 is accommodated in the interior of the water chamber 21, in which cooling water flows through the inlet 22 and an outlet (not shown), so that the cutting of the plastic issuing from the orifices 9 takes place tinder the influence of the cooling water, causing the cut lengths of the plastic issuing from the orifices 9 to rapidly solidify into granulate and be flushed out of the interior of the water chamber 21. The water chamber 21 is rigidly connected to the die plate 1 in a manner not shown in any greater detail, a seal 23 being inserted between the water chamber 21 and the die plate 1 to insulate the heated die plate 1 from the interior of the water chamber 21 filled with cooling water.

Figure 2:
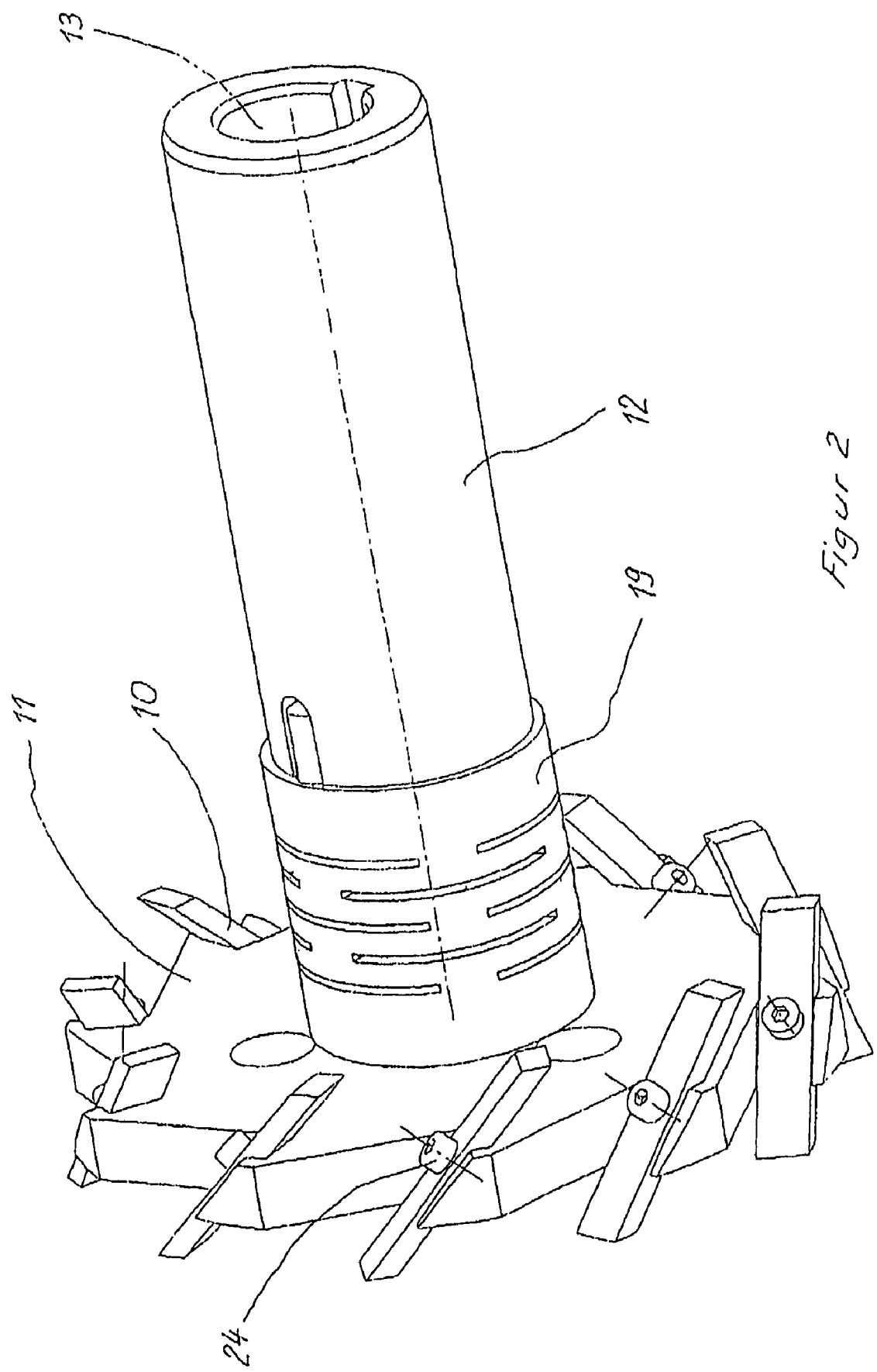
FIG. 2 shows a perspective view of the device according to FIG. 1 excluding the parts with the die plate.

FIG. 2 shows a perspective view of the drive shaft 12 with the slotted spring and the rotary cutter head 11 with the cutters 10. The individual cutters 10 are attached to the rotary cutter head 11 by the screw connections 24. FIG. 2 makes it clear that the connection of drive shaft 12 and rotary cutter head 11 through the slotted spring 19 allows the rotary cutter head only a slight tilting motion with respect to the axis of the drive shaft, this permitting the compensation of the above-described possible inaccuracies with regard to the position of the drive shaft 12 and the orientation of the die plate 1.

Figure 3:
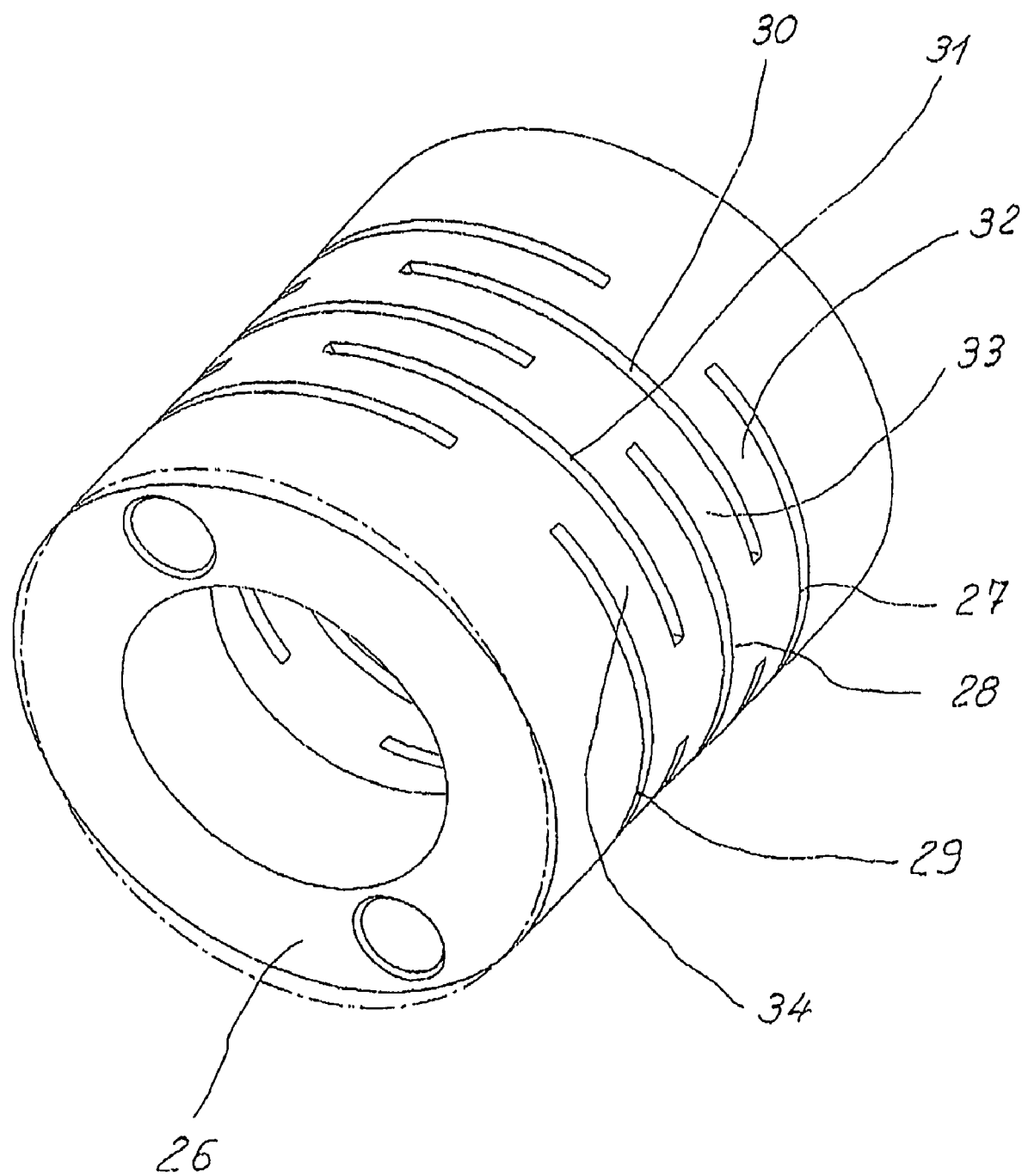
FIG. 3 shows a slotted spring in perspective view.

FIG. 3 shows the slotted spring 19 in isolation in order to illustrate its functioning. It consists of the tubular segment 26, into which are worked next to one another the slots 27, 28 and 29. Said slots penetrate the tubular segment 26 radially and extend beyond the axis of the tubular segment 26 such that, in combination with the slots 30 and 31, which are also worked into the tubular segment 26, they form overlap regions 32, 33 and 34, over which the axial continuity of the slotted spring 19 extends, but which allow the two ends of the slotted spring 19 a certain bending of the imaginary axis of the slotted spring, as indicated by the dash-dotted line in FIG. 3.

Figure 4:
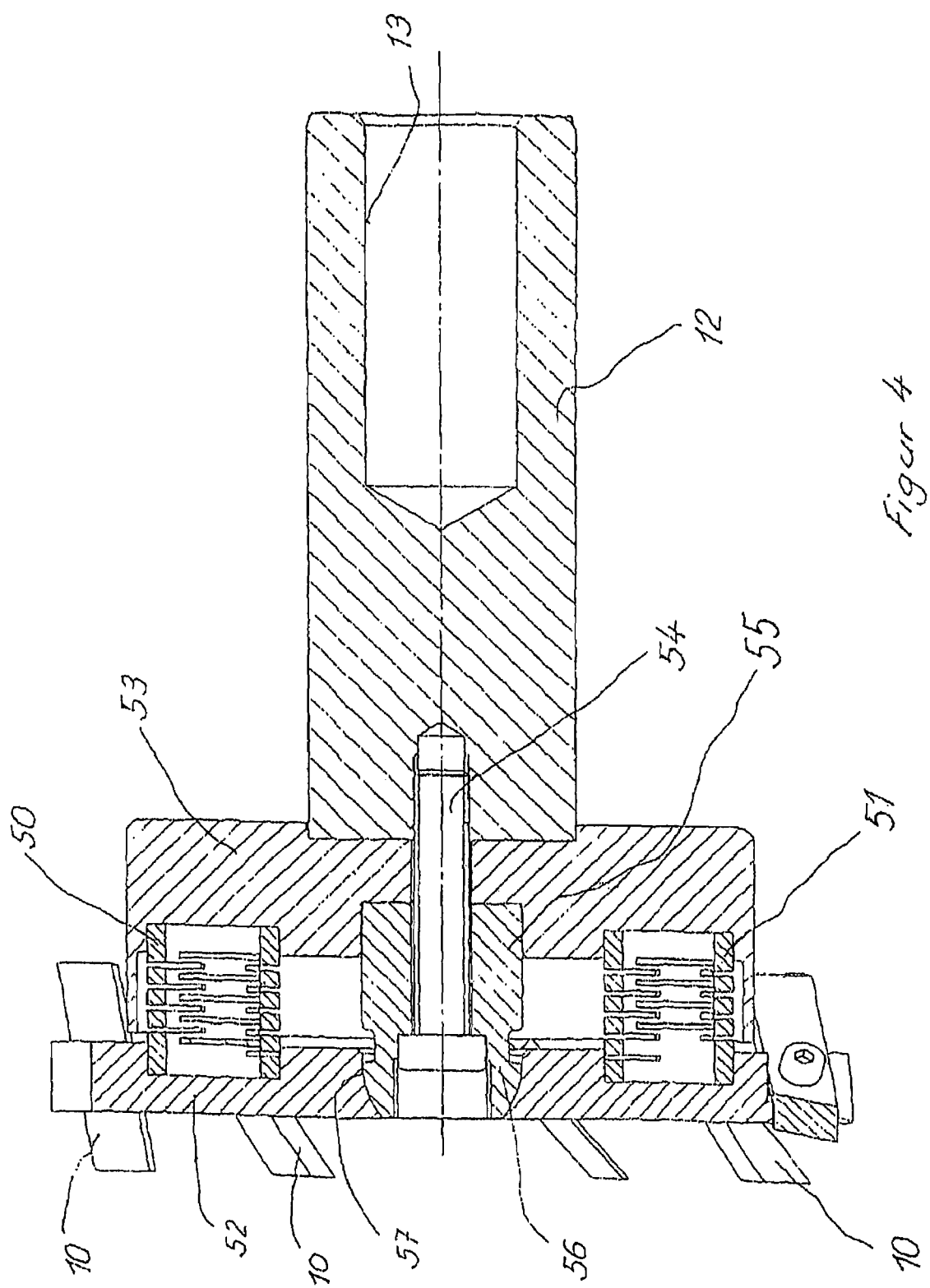
FIG. 4 shows the device excluding the die plate with a plurality of slotted springs in a rotationally symmetrical arrangement.

Shown in FIG. 4 is the above-mentioned further embodiment of a device for granulating thermoplastic materials, in which, in contrast to the embodiment in FIGS. 1 and 2, a plurality of tubular slotted springs are used as torque transmitting elements. Of these, the slotted springs 50 and 51 are shown in FIG. 4. The slotted springs 50 and 51 connect the rotary cutter head 52, which carries the cutters 10, to the flange 53, which is screwed onto the drive shaft 12 by means of the screw 54. The torque is thus transmitted from the drive shaft 12 to the rotary cutter head 52 through the flange 53 and the slotted springs 50 and 51.

Recessed into the flange 53 with a rotationally fixed connection is the sleeve 55, which terminates on its side facing away from the end of the drive shaft 12 in the spherical portion 56 on which the rotary cutter head 52 is positional. To match the spherical surface of the spherical portion 56, the rotary cutter head has a recess with a spherical inner surface 57, which allows the rotary cutter head 52 a small tilting motion about the centrepoint of the spherical portion 56. As a result of the rigid connection of the ends of the slotted springs 50 and 51 and of the further slotted spring (according to FIG. 5) to the flange 53 at one end and to the rotary cutter head 52 at the other end, the rotary cutter head 52 is also maintained in such a connection with the flange 53 that the rotary cutter head 52 cannot drop off the flange 53 during any cleaning operations.

Figure 5:
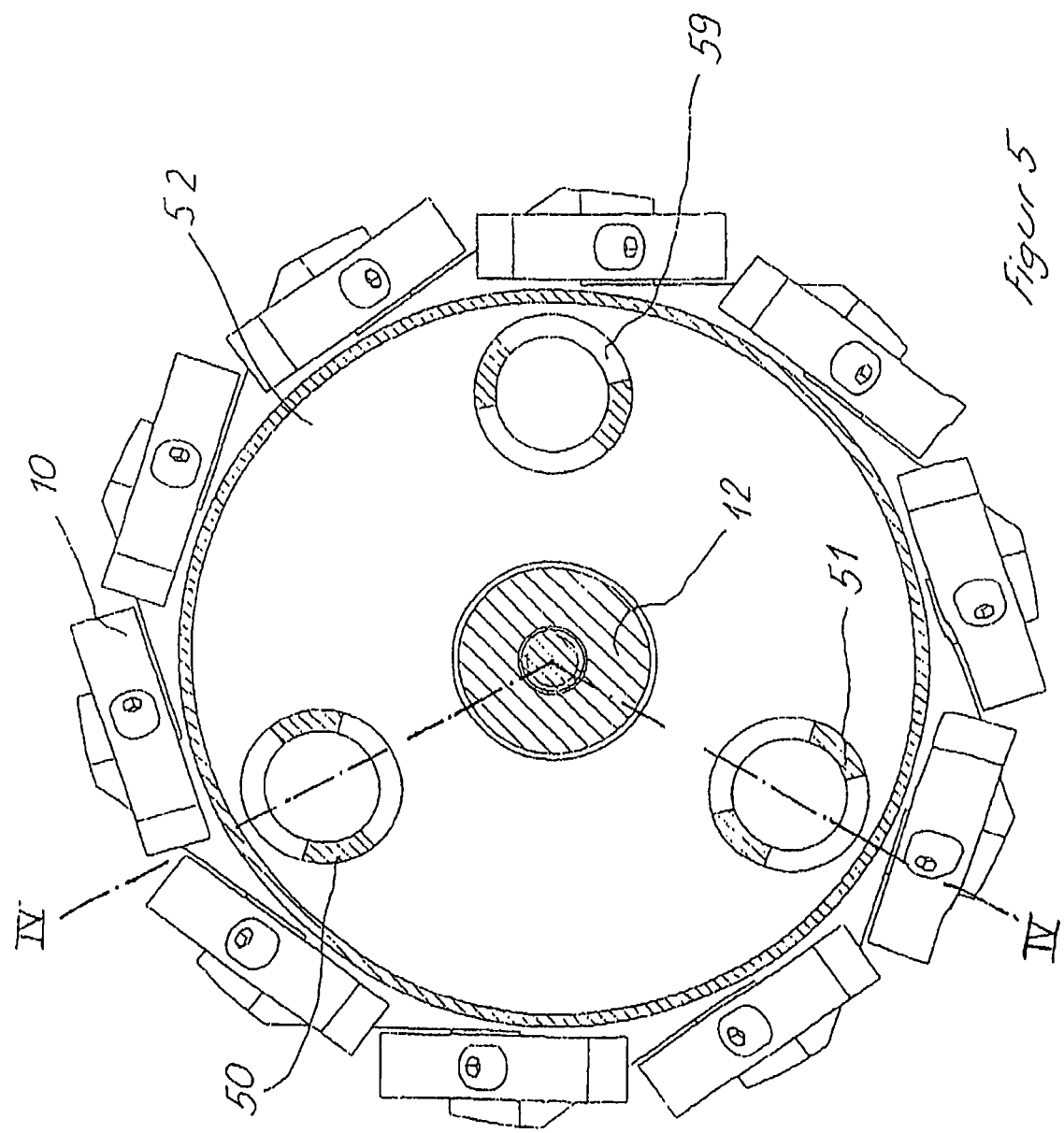
FIG. 5 shows a view of the rotary cutter head with rotationally symmetrically disposed slotted springs.

FIG. 5 shows the arrangement according to FIG. 4 with a section along line IV-IV, with the consequence, therefore, that only two of a total of three slotted springs appear in FIG. 4, namely slotted springs 50 and 51, while the third slotted spring 59 is shown in FIG. 5. FIG. 5 makes clear the rotationally symmetrical arrangement of the slotted springs 50, 51 and 59, which surround the sleeve 55 in an extension of the drive shaft 12 and thereby symmetrically exert a pressure originating from the flange 53 on the rotary cutter head 52, which carries the cutters 10 in known manner. As a result of this arrangement, the rotary cutter head 52 is centered by the drive shaft 12, but is able, for example in the event of a change in the position of a die plate not shown in FIG. 4 (see FIG. 1), to compensate for such change by slightly tilting the rotary cutter head 52 relative to the drive shaft 12, the slotted springs pressing the cutters 10 gently against a die plate even in the event of a slightly tilted position of the rotary cutter head 52 relative to the drive shaft 12 and without requiring any maintenance.

With regard to the die plate and the adjoining water chamber, reference is made to FIGS. 1 and 2.

What is claimed is:

1. Device for granulating thermoplastic materials with a die plate (1) and a rotary cutter head (11), said rotary cutter head (11) carrying cutter knives (10) and being positioned in front of said die plate (1) in a water chamber (21), said rotary cutter head (11) being centered by means of a rocker bearing (14, 15) and being connected in rotationally fixed manner to an axially displaceable drive shaft (12) through a torque transmitting element, characterized in that the torque transmitting element is in the form of a tubular slotted spring (19) surrounding the drive shaft (12), said slotted spring (19) connecting the end of the drive shaft (12) facing the rotary cutter head (11) to the rotary cutter head (11) in the peripheral region of the rocker bearing (14, 15), said rocker bearing (14, 15) being disposed between the end of the drive shaft (12) and the rotary cutter head (11) in the radial direction.

2. Device for granulating thermoplastic materials with a die plate and a rotary cutter head (52), said rotary cutter head (52) carrying cutter knives (10) and being positioned in front of said die plate in a water chamber, said rotary cutter head (52) being centered by means of a rocker bearing (56, 57) and being connected in rotationally fixed manner to an axially displaceable drive shaft (12) through a torque transmitting element, characterized in that the torque transmitting element consists of a plurality of tubular slotted springs (50, 51, 59), said slotted springs (50, 51, 59) being provided rotationally symmetrically in an annular arrangement around the drive shaft (12) and connecting the drive shaft (12) through a flange (53) on the drive shaft (12) to the rotary cutter head (52) in the peripheral region of the rocker bearing (56, 57), said rocker bearing (56, 57), being disposed between the flange (53) and the rotary cutter head.

3. Device according to claim 1, characterized in that the rocker bearing is composed of a ring (15) with a spherical outer surface and of a penetration with a corresponding spherical inner surface (14) in the rotary cutter head (11), wherein the ring (15) is removably fastened to the drive shaft (11) by means of a screw (17) screwed into the drive shaft (11) from the side of the die plate (1).

* * * * *

UNITED STATES PATENT AND TRADEMARK OFFICE
CERTIFICATE OF CORRECTION

PATENT NO. : 7,296,985 B2 Page 1 of 1
APPLICATION NO. : 10/572394
DATED : November 20, 2007
INVENTOR(S) : Willfried Koehler It is certified that error appears in the above-identified patent and that said Letters Patent is hereby corrected as shown below:

Title page, lines 14-15, at item number 87:

(87) PCT Pub. No.: ~~WO02/40236~~

PCT Pub. Date: ~~May 23, 2002~~

Should Read as:

(87) PCT Pub. No.: <u>WO05/037511</u>

PCT Pub. Date: <u>April 28, 2005</u>

Signed and Sealed this

Sixteenth Day of March, 2010

David J. Kappos
*Director of the United States Patent and Trademark Office*